US008953554B2

(12) United States Patent
Kazmi et al.

(10) Patent No.: US 8,953,554 B2
(45) Date of Patent: Feb. 10, 2015

(54) CELL RESELECTION BASED ON USE OF RELATIVE THRESHOLDS IN A MOBILE TELECOMMUNICATION SYSTEM

(75) Inventors: Muhammad Kazmi, Bromma (SE); Walter Müller, Upplands Väsby (SE)

(73) Assignee: Optis Wireless Technology, LLC, Plano, TX (US)

( * ) Notice: Subject to any disclaimer, the term of this patent is extended or adjusted under 35 U.S.C. 154(b) by 882 days.

(21) Appl. No.: 12/676,499

(22) PCT Filed: May 19, 2008

(86) PCT No.: PCT/EP2008/004019
§ 371 (c)(1),
(2), (4) Date: Mar. 4, 2010

(87) PCT Pub. No.: WO2009/030289
PCT Pub. Date: Mar. 12, 2009

(65) Prior Publication Data
US 2010/0208604 A1    Aug. 19, 2010

(30) Foreign Application Priority Data

Sep. 5, 2007    (SE) ........................................ 0701988

(51) Int. Cl.
*H04W 4/00* (2009.01)
*H04W 36/24* (2009.01)
*H04W 36/00* (2009.01)
*H04W 36/30* (2009.01)

(52) U.S. Cl.
CPC .............. *H04W 36/24* (2013.01); *H04W 36/30* (2013.01)
USPC .......................................... 370/331; 455/436

(58) Field of Classification Search
None
See application file for complete search history.

(56) References Cited

U.S. PATENT DOCUMENTS

| 7,003,290 | B1 * | 2/2006 | Salonaho et al. ............. 455/423 |
| 7,693,521 | B1 * | 4/2010 | Ribas et al. .................... 455/437 |
| 2001/0053695 | A1 * | 12/2001 | Wallentin ....................... 455/436 |
| 2002/0082012 | A1 | 6/2002 | Wang et al. |
| 2005/0107110 | A1 * | 5/2005 | Vasudevan et al. ........... 455/525 |

(Continued)

FOREIGN PATENT DOCUMENTS

| EP | 1143756 A1 | 10/2001 |
| EP | 1734779 A2 | 12/2006 |

(Continued)

OTHER PUBLICATIONS

Senarath, G., et al., "Adaptive Handoff Algorithms Using Absolute and Relative Thresholds for Cellular Mobile Communications Systems," 48th Annual Vehicular Technology Conference, IEEE vol. 2, pp. 1603-1607, 1998.

*Primary Examiner* — Xavier Szewai Wong
(74) *Attorney, Agent, or Firm* — Vincent J. Allen; Stephen Y. Liu; Carstens & Cahoon, LLP

(57) ABSTRACT

A user equipment performs downlink measurement on neighbour cells, but the measurement performance on a target cell (in terms of measurement period/sampling/accuracy etc) is dependent on the relative performance difference between the target cell and a reference cell. The reference cell may be the serving cell, or may be the strongest cell. The network is thus able to keep track of the required number of target cells without degrading the measurement performance of important cells. The UE on the other hand is still able to save its battery as much as possible while making full use of DRX.

19 Claims, 2 Drawing Sheets

(56) References Cited

U.S. PATENT DOCUMENTS

2005/0130662 A1* 6/2005 Murai ............................ 455/444
2009/0111481 A1* 4/2009 Samuel et al. ............. 455/452.2

FOREIGN PATENT DOCUMENTS

| WO | 01/19100 A1 | 3/2001 |
| WO | 2008/156304 A2 | 12/2008 |

* cited by examiner

CELL RESELECTION BASED ON USE OF RELATIVE THRESHOLDS IN A MOBILE TELECOMMUNICATION SYSTEM

TECHNICAL FIELD

This application claims priority and benefit from Swedish patent application No. 0701988-8, filed Sep. 5, 2007, the entire teachings of which are incorporated herein by reference. This application also claims priority from PCT/EP2008/004019 filed May 19, 2008, the disclosure of which is incorporated here by reference The present invention relates to methods and arrangements in a mobile communication system, in particular to relative threshold-based neighbour cell measurement activities.

BACKGROUND

Mobility decisions including cell reselection and handover in Universal Terrestrial Radio Access Networks (UTRAN) and evolved UTRAN (E-UTRAN) rely on downlink measurements performed by the user equipments (UE). Therefore, in order to ensure a good UE mobility performance the UE need to be able to measure and keep track of a certain number of best cells in terms of downlink measured quality.

In UTRAN a UE in active mode is required to measure and to be able to report the downlink quality (i.e. CPICH measurements) of at least 8 cells (one serving and seven neighbour cells), while fulfilling the minimum performance requirements as specified in the document 3GPP TS 25.133, "Requirements for support of radio resource management (FDD)" issued by the 3rd Generation Partnership Project (3GPP). For E-UTRAN, measurement performance requirements are expected to be similar to those used in UTRAN and will most likely be specified in the document 3GPP TS 36.801, "Evolved Universal Terrestrial Radio Access (E-UTRA); Measurement Requirements".

Basically, two kinds of mobility can be distinguished, whereby both the mobility decisions are mainly based on the same kind of downlink measurements as will be discussed in more details below.

a) Idle mode mobility includes cell reselection, which is mainly a UE-autonomous function without the intervention of its serving cell. However, to some extent the UE behaviour in this mobility scenario could still be controlled by some broadcasted system parameters and performance specification.

b) Connected mode mobility includes handovers, which are fully controlled by the network through explicit UE specific commands and by performance specification. But the handover decisions do heavy rely on the UE measurement reports.

UTRAN and E-UTRAN are frequency reuse-1 systems meaning that the geographically closest neighbour cells operate on the same carrier frequency. An operator may also deploy multiple frequency layers within the same coverage area. Therefore, idle mode and connected mode mobility in both UTRAN and E-UTRAN can be broadly classified into the following three main categories:

Intra-frequency mobility (idle and connected modes): In intra-frequency mobility a UE moves between the cells belonging to the same carrier frequency. This is the most important mobility scenario since it involves less cost in terms of delay due. In addition an operator would have at least one carrier at its disposal that it would like to be efficiently utilized.

Inter-frequency mobility (idle and connected modes): In inter-frequency mobility the UE moves between cells belonging to different carrier frequencies but of the same access technology. This could be considered as the second most important scenario.

Inter-RAT mobility (idle and connected modes): In inter-RAT mobility the UE moves between cells that belong to different access technologies such as between UTRAN and GSM or vice versa.

In UTRAN the following three downlink quality measurements are specified, primarily for mobility reasons (cf. 3GPP TS 25.215, "Physical layer measurements (FDD)"): CPICH RSCP, CPICH Ec/No, and UTRA carrier RSSI. The first two of the above measurements are performed by the UE on cell level basis on the common pilot channel (CPICH). The UTRA carrier RSSI is measured over the entire carrier. The above CPICH measurements are the main quantities used for the mobility decisions.

In E-UTRAN the following three downlink quality measurements are specified primarily for mobility reasons (cf. 3GPP TS 36.214 "Evolved Universal Terrestrial Radio Access (E-UTRA); Physical layer measurements"): Reference symbol received power (RSRP), reference symbol received quality (RSRQ), and E-UTRA carrier RSSI. The first two of the above measurements are performed by the UE on cell level basis on reference symbols. As in case of UTRAN, the E-UTRA carrier RSSI is measured over the entire carrier. The two RS based measurements are indeed also the main quantities, which are likely to be used for the mobility decisions.

In order to guarantee good mobility performance several aspects of measurement performance of the downlink quality measurements have been specified whereby the specification covers the minimum requirements to ensure that a UE meets at least these requirements including identification delay of unknown cells for the given received level of the corresponding synchronization and CPICH signals. The max delay is up to 800 ms for intra-frequency cells;

minimum number of identified cells (N=8 including one serving and 7 neighbour cells) for which UE is supposed to report the CPICH measurements with the specified measurement absolute and relative accuracies;

the measurement period of 200 ms over which the specified measurement accuracies of at least 8 cells is fulfilled.

To fulfil the standardized minimum requirements and due to varying radio conditions the UE needs to identify and measure the neighbour cells on regular basis. The scheduling of such measurement process is not standardized but is rather UE implementation specific. To limit hardware costs and to prevent battery exhaustion the UE can typically collect measurement samples for different type of measurements at some periodic intervals.

In idle mode the UE performs measurements mainly at the paging occasions (i.e. at the wake instances at the end of DRX cycle). Therefore, the measurement sampling rate in idle mode is considerably low compared to the connected mode scenario. Thus, measurement performance in idle mode becomes much coarser than in connected mode, but the UE is enabled to save power in idle mode. Furthermore, in idle mode the mobility performance, which is affected by the measurement performance, is required to be less demanding than in connected mode.

In Release 7 of the 3GPP-specifications a new feature called discontinuous reception (DRX) in connected mode (more specifically in CELL_DCH state) has been specified. This feature allows a UE to save its battery while stay connected since it wakes up only at periodic instances according to the DRX cycle. However, the DRX feature also implies that the UE will mainly collect the measurement samples at the wake up instances. Accordingly, the measurement requirements have been relaxed in DRX mode. Therefore, DRX in active mode may have some adverse effect on the mobility performance. In order that the UE can save power, some level of performance degradation is inevitable, but it should be limited to a level which can ensure some minimum quality of service.

The present invention addresses problems in conjunction with existing measurements as described above. Regarding measurements in a non-DRX scenario, the UE performs in the basic intra-frequency mobility scenario in the connected mode without any DRX the downlink measurement on all the desired cells (i.e. 8 cells in UTRAN) with the same intensity. This means the same measurement performance (e.g. measurement delay, cell identification delay, measurement accuracy etc) is achieved for all cells irrespective of their reception quality. This, however, leads to intense processing at the UE whereas in some scenarios it might be sufficient to attain the better performance for a sub-set of the cells. In such cases the processing at the UE could be minimized. Regarding measurements in a DRX scenario, if the UE only measures during the active times the measurement performance of the mobility-related measurements will be worse than in non DRX scenario. The performance degradation depends upon the actual DRX cycle used. For instance, due to the DRX operation the measurement period can be extended resulting in longer measurement reporting delay and, as a consequence, delay handover decisions at the base station, which relies on UE measurement reports for executing handover. Therefore, in active mode the performance degradation of these measurements should be minimized to prevent unnecessary call dropping.

There are several prior-art solutions for minimizing the performance degradation of the measurements. However, the main limitation of these solutions is that they do not consider the relative performance difference between the serving and the target/neighbour cell which is important in mobility performance. The following methods have been proposed:

Reduction in the number of cells: One solution is simply to reduce the number of cells that the UE is supposed to measure in DRX mode, e.g. 4 cells in DRX instead of 8 in non DRX. This would reduce the measurement delay since UE has to sample fewer cells. The main drawback is that UE keeps track of only fewer cells than are needed. The radio conditions could change quickly thereby worse cells could become better and vice versa. For this reason it's advisable that UE measures all the desired number of cells e.g. 8 cells in UTRAN.

Measure on cells with higher SCH and CPICH received levels: The currently agreed solution is that UE in DRX performs measurement on the same number of cells as in case of non DRX provided the minimum received level on synchronization channel (SCH) and common pilot channel (CPICH) on that cell is significantly higher (e.g. 3 dB higher than in case of DRX). Since cells are relatively stronger therefore on the average the measurement delay would be slightly reduced.

Absolute thresholds based measurements: The network provides the UE with absolute thresholds in terms of CPICH Ec/Io or CPICH RSCP levels. As long as the received CPICH Ec/No and/or CPICH RSCP from the serving cell are above these signalled thresholds, the UE is not required to measure other intra-frequency cells. When this condition is no longer met, the UE will start measuring other neighbour cells. A similar mechanism is used in idle mode to save UE battery. One difference between idle and active modes in UTRAN is that in idle mode there is only one cell used by the UE for decoding, whereas in active mode the UE may be receiving channels from multiple cells in soft handover. Thus it is important that the UE keeps track of more than one cell in active mode. Furthermore, in active mode due to the risk of call dropping it is not feasible that the UE performs measurement only on the serving cell until the corresponding measurement quantity falls below the threshold.

Absolute thresholds and measurement activity based measurements: This describes a refinement of scheme described above. The idea is that the network signals CPICH Ec/No and/or CPICH RSCP absolute thresholds and some measurement activity factor. The latter parameter is used to scale the measurement activity (e.g. cell identification time, measurement period) depending on the CPICH Ec/Io and/or CPICH RSCP reception level of the strongest monitored cell in the active set. The UE measures on the target cells with varying activity level that depends on the reception level of the serving cell. One drawback is that the UE will have to measure more often and potentially will have to wake up during the inactive time of the DRX length. This will drain UE battery thereby defying the benefits of DRX operation.

Switch to continuous mode (non DRX) in cell border region: The UTRAN specifications allow network in active mode to promptly direct the UE to switch between DRX and non DRX modes through low level signalling. Thus, one possible solution to speed up the measurement process is to revert to non DRX mode (or very short DRX cycle) when UE enters in cell border region. The network can determine whether UE lies in cell border region or not by comparing the UE reported downlink channel quality (e.g. CPICH level) with a certain threshold. Typically between 25-35% users operate in the cell border region. Thus with approach on the average between 65-75% of the time the UE could barely stay in DRX. Since UE cannot fully utilize DRX, therefore this approach is not desirable from UE battery saving perspective.

DETAILED DESCRIPTION

Figure 1:
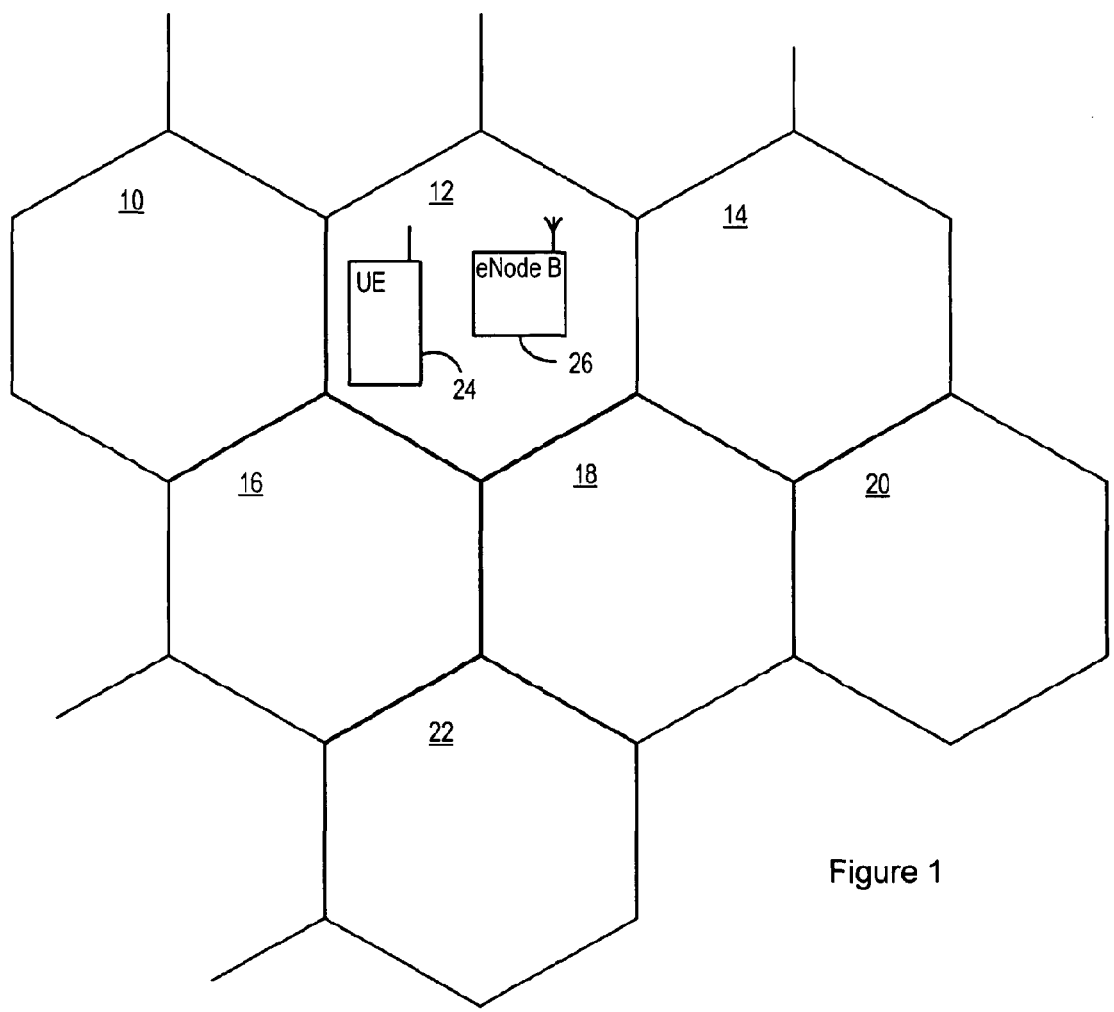
FIG. 1 illustrates a cellular communication network in accordance with the present invention.

FIG. 1 illustrates schematically a cellular communications network operating in accordance with the invention.

The network coverage area is divided into cells 10, 12, 14, 16, 18, 20, 22, etc. A user equipment (UE) 24 is located in the cell 12, and is in communication with a base station (eNode B) 26 in that cell, which is therefore the serving cell for that UE. As is well known, the UE must make measurements on the signals received from other cells, in order to identify potential neighbour cells. The invention will be described herein primarily with reference to a Long term evolution (LTE) network, but it will be appreciated that it can be applied to many other networks.

Figure 2:
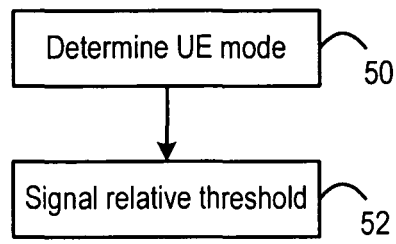
FIG. 2 is a flow chart, illustrating a first method in accordance with an aspect of the present invention.

FIG. 2 is a flow chart, illustrating a first method in accordance with the present invention, performed in a radio network node.

In step 50, the radio network node determines whether a UE is in idle mode or active mode. In step 52, the radio network node signals one or more relative thresholds to the UE. These steps are described in more detail below.

Figure 3:
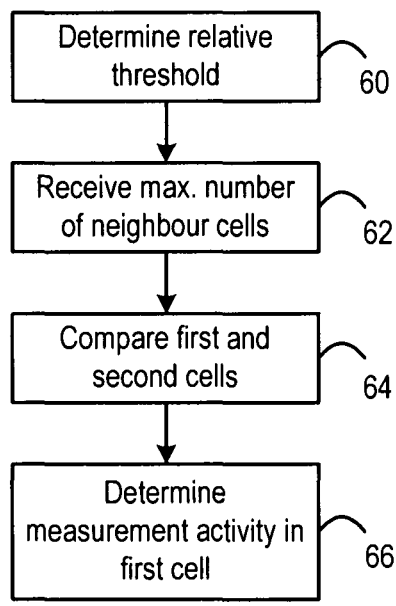
FIG. 3 is a flow chart, illustrating a second method in accordance with an aspect of the present invention.

FIG. 3 is a flow chart, illustrating a second method in accordance with the present invention, performed in a user equipment.

In step 60, the UE determines a relative threshold for use in the method. In some embodiments, described in more detail below, one or more relative threshold has been signalled to the UE by the radio network node. However, in other embodiments, the one or more relative threshold may be a fixed, pre-coded, value that is based on some standard, and therefore does not need to be signalled to the UE. In this case, step 60 may simply involve retrieving the threshold value from a memory. In step 62, the UE receives a parameter representing the maximum number of neighbour cells on which the UE can perform measurements with normal or high intensity. In step 64, the UE compares a first, target, cell and a second, reference, cell. In step 66, the UE determines the downlink measurement activity to be used on the first cell. These steps are described in more detail below.

It is the basic concept of the present invention that the UE performs downlink measurement on the neighbour cells but that their measurement performance (in terms of measurement period/sampling/accuracy etc) is dependent on the relative performance difference between the serving and the target cells. A further embodiment of the present invention considers the fact that the serving cell not necessarily is the strongest cell and therefore the measurement performance of the target cell depends on the relative performance difference between the strongest cell and the target cells.

The present invention implies the advantages that the network is able to keep track of the required number of target cells without degrading the measurement performance of important cells. The UE on the other hand is still able to save its battery as much as possible while making full use of DRX. It is thus an advantage of the present invention to maintain a reasonably good cell change or handover performance.

The measurement activity level is determined by the relative thresholds signalled by the network. Relative thresholds can be expressed in terms of, e.g., measurement quantity (e.g. CPICH Ec/No in UTRAN or RSRQ in E-UTRAN), SCH received level, cell identification delay, etc.

The measurement activity for measurements on a particular cell is determined by the UE after comparing it with the serving cell. Therefore, the network signals at least one relative threshold that can be used by the UE to compare the cells. The UE performs measurements on all or a sub-set of cells (serving and neighbour cells). But the measurement activity is dependent on whether the difference of the measured quantity between the serving and target cell is larger or smaller than the relative threshold.

The relative threshold determines the measurement quantity that should be used by the UE to compare cells. In other words the relative threshold determines the comparison criterion. Such thresholds could be expressed, e.g., by help of one or more of the following parameters:

Neighbour cell measurement level (e.g. RSCP and/or Ec/No in UTRAN or RSRP and/or RSRQ in E-UTRAN);
SCH received level (e.g. SCH SINR, BER or received signal strength);
Received level on any known pilot or reference symbol;
Cell identification delay.

The threshold can be based on the neighbour level measurements. In a state-of-the-art system the absolute threshold is also signalled in terms of CPICH Ec/No or CPICH RSCP levels. Therefore, in a conceivable embodiment of the invention it is the UE that judges the cells by measuring their CPICH levels (or RSRP/RSRQ in E-UTRAN) and compares the measurement difference with the relative threshold. According to other embodiments of the present invention this comparison can be done according to one or more of the criteria cited above. Furthermore, the above relative thresholds can be single level or multi-level (M). In the former approach the network signals only one threshold per criterion leading to two levels of measurement activity (normal or high and low) whereas in the latter approach the network signals several relative thresholds per criterion, which requires the UE to achieve several measurement activity levels (i.e. M+1 for M threshold).

It is also possible that the network specifies how often (i.e. periodicity of comparison) the UE has to compare the cells based on the relative thresholds. This can be either a signalled parameter or specified for instance in terms of a number of frames, a number of DRX cycles, or some fixed durations.

The above thresholds and other related parameters (e.g. periodicity to compare the cells) can be signalled by state-of-the-art methods using radio resource control (RRC) or any appropriate higher layer signalling. Thresholds could be signalled via broadcast channel to all UEs or to specific UE via UE specific control channel. Furthermore, different threshold values for the same criterion can be used in idle mode and active mode.

In UTRAN the radio network controller (RNC) controls the signalling of these thresholds since radio resource control (RRC) functionality resides in the radio network controller whereas in E-UTRAN the thresholds are signalled by the base station (i.e. the eNodeB). In principle the following aspects of the measurement performance can be affected when the measurement activity varies in accordance with the relative threshold:

Measurement period of the measurement quantity;
relative and absolute accuracies of the measurement quantities;
identification delay of cells.

It is possible to trade between the parameters measurement period and measurement accuracy. For instance, the measurement accuracies considerably depend on the number of measurement samples obtained by the UE during the measurement period. Therefore it would still be possible to maintain the same measurement accuracies (as achievable with normal activity) simply by extending the measurement period, provided the UE is able to collect the adequate number of measurement samples. Furthermore the UE could still carry out downlink measurements from the same number of cells that are used in normal operation (e.g. 8). In this way the UE is able to keep track of all the required number of cells except that some weaker cells would be sampled less frequently.

The UE measurement activity of a particular target cell will be based on the relative performance difference between this target cell and a reference cell. Broadly there are the two possibilities: comparison with serving cell or comparison with the best cell. If the reference cell is the serving cell the UE always compares the target cell with the serving cell using one or more of the criteria outlined above. Based on this comparison the UE will decide whether to measure the target cell with the same intensity or with a lower intensity. This method will ensure that the UE always samples the serving cell with full or high intensity, irrespective whether the serving cell is the strongest one or not. As an example, assume both signal, quality (RSRQ in E-UTRAN or CPICH Ec/No in UTRAN) and signal strength (e.g. RSRP in E-UTRAN or RSCP in UTRAN) are used to determine the measurement activity. Furthermore, consider only single level relative thresholds, i.e. α and β for RSRQ (or CPICH Ec/No) and RSRP (or RSCP) respectively. Then the UE will measure the target cell K less frequently (resulting in coarse downlink measurement performance) if one or both of these measured quantity difference between the target and serving cell S falls below the corresponding threshold. Thus:

IF $(Q_K - Q_S \leq \alpha)$ OPERATOR $(P_K - P_S \leq \beta)$
THEN Reduce measurement activity on target cell K
ELSE Measure target cell K with normal activity.

where Q denotes RSRQ in E-UTRAN and CPICH Ec/No in UTRAN and P denotes RSRP in E-UTRAN and RSCP in UTRAN. The term OPERATOR can in one arrangement for both E-UTRAN and UTRAN be defined as AND and in an alternative arrangement for both E-UTRAN and UTRAN as OR. In yet another embodiment of the present invention only one of the measurement quantities (Q or P) is used in the above algorithm by the UE to decide the measurement activity level on the target cell.

If the reference cell is the best cell the UE always compares the target cell with the best cell, which may not always be the serving cell. As before the UE uses one or more of the criteria outlined above. Based on this comparison the UE will decide whether to measure the target cell with the same intensity or with a lower intensity. As an example, assume both signal quality (RSRQ in E-UTRAN or CPICH Ec/No in UTRAN) and signal strength (e.g. RSRP in E-UTRAN or RSCP in UTRAN) are used to determine the measurement activity. Furthermore, consider only single level relative thresholds, i.e. α and β for RSRQ (or CPICH Ec/No) and RSRP (or RSCP) respectively. Then the UE will measure the target cell K less frequently (resulting in coarse downlink measurement performance) if one or any of these measured quantity difference between the target and best cell B falls below the corresponding threshold.

Thus:
IF $(Q_K - Q_B \leq \alpha)$ OPERATOR $(P_K - P_B \leq \beta)$
THEN Reduce measurement activity on target cell K
ELSE Measure target cell K with normal activity.

The symbols Q, P, and OPERATOR have the same meaning as for the example above.

There might be a situation where all target cells to be measured (N) are good compared to the serving/best cell as determined by the relative thresholds. This means that in such a scenario the UE will be forced to measure all these cells with high or normal intensity. In most scenarios it is not required that UE measures all such cells with the same intensity since there is sufficient number of good cells to perform handover. To prevent this situation one more parameter called maximum cells to measure with high intensity (L) can be introduced. This implies that the UE would be required to measure maximum up to L (L<N) cells with normal or high intensity. Where, N is the minimum (or total) number of identified cells to be measured. The default value of L=N, i.e. when N is not signalled. Again, a value of N could be fixed in a standard, and hence could be stored in the UE, in order to avoid the need for the value of N to be signalled.

There is thus described a system in which the downlink measurement activity in a cell can be determined based on the comparison between that cell and a serving cell, or another cell that is better than the serving cell.

The invention claimed is:

1. A method in a radio network comprising a plurality of radio network nodes, the method comprising:
   determining a mode of user equipment, wherein the mode is one of an active mode or an idle mode; and
   signaling to said user equipment one or more relative thresholds, the one or more relative thresholds selected based on the mode of the user equipment, wherein the one or more relative thresholds are usable to establish a downlink measurement activity level as determined by a comparison of a measurement quantity of a target cell with that of a reference cell; and
   receiving downlink measurements by the target cell at a reduced downlink activity measurement level if a comparison of a first measurement quantity of the target cell and a second measurement quantity of the reference cell indicates that the target cell is worse than the reference cell by the relative threshold, and receiving downlink measurements by the target cell at a normal downlink activity measurement level if the first measurement quantity of the target cell becomes greater than or equal to the second measurement quantity of the reference cell by the relative threshold.

2. The method according to claim 1 wherein the reference cell is a serving cell on which the user equipment is currently camped on or connected to.

3. The method according to claim 1 wherein the reference cell is a best cell in terms of downlink quality or signal strength of a known reference signal.

4. The method according to claim 1 wherein the one or more relative threshold is a multi-level threshold.

5. The method according to claim 1, further comprising the step of signalling to said user equipment a parameter representing a maximum number of neighbour cells up to which the user equipment can perform downlink measurements with normal or high intensity.

6. A method in a user equipment in communication with a radio network, the method comprising:
   receiving while in one of active or idle mode, from the radio network, one or more relative thresholds corresponding to a relative performance difference between a target cell and a reference cell; and
   establishing, with reference to the one or more relative thresholds, a downlink measurement activity level as determined by a comparison of a measurement quantity of the target cell with that of the reference cell;
   performing downlink measurement of the target cell at a reduced downlink activity measurement level if the compared measurement quantity of the target cell is worse than that of the reference cell by the relative threshold, and wherein the downlink measurement of the target cell reverts to normal if the compared measurement quantity of the target cell becomes greater than or equal to that of the reference cell by the relative threshold.

7. The method according to claim 6 wherein the reference call is a serving cell which the user equipment is currently camped on or connected to.

8. The method according to claim 6 wherein the reference cell is a best cell in terms of downlink quality or signal strength of a known reference signal.

9. The method according to claim 6 wherein the user equipment receives said one or more relative threshold as a multi-level threshold.

10. A radio network node configured to signal measurement thresholds to a user equipment in order to allow said user equipment to determine whether to perform downlink measurements on a target cell, comprising means for performing the method according to claim 1.

11. A user equipment configured to receive measurement thresholds from a radio network and using the measurement thresholds to determine whether to perform downlink measurements on a target cell, and further configured for performing the method according to claim 6.

12. A method of performing downlink measurements in a user equipment of a cellular telecommunication system, the method comprising:
- for each of a plurality of target cells of the cellular system, determining a relative performance difference between the target cell and a reference cell;
- setting a downlink measurement activity level for the target cell based on the relative performance difference between the target cell and the reference cell; and
- performing downlink measurement of the target cell at a reduced downlink activity measurement level if the performance difference indicates that the target cell is worse than that of the reference cell by the relative threshold, and wherein the downlink measurement of the target cell reverts to normal if the performance difference indicates that the target cell is greater than or equal to the reference cell by the relative threshold, and wherein the relative threshold is received while in one of active or idle mode.

13. The method as claimed in claim 12, wherein the reference cell is a serving cell.

14. The method as claimed in claim 12, wherein the reference cell is a strongest cell.

15. The method as claimed in claim 12, wherein the step of determining a relative performance difference between the target cell and the reference cell further comprises determining whether the performance difference exceeds a threshold value.

16. The method as claimed in claim 15, further comprising receiving said threshold value in signalling from a network node of the cellular communication system.

17. The method as claimed in claim 15, wherein said threshold value is stored in the user equipment.

18. The method as claimed in claim 12, wherein the downlink measurement activity level for the target cell comprises a measurement period for performing measurements.

19. A user equipment, configured to perform downlink measurements according to the method as claimed in claim 12.

* * * * *